(12) United States Patent
Chiang

(10) Patent No.: US 8,649,194 B2
(45) Date of Patent: Feb. 11, 2014

(54) ELECTRO-MAGNETIC INTERFERENCE REDUCTION CIRCUIT FOR POWER CONVERTERS AND METHOD THEREOF

(75) Inventor: Ting-Ta Chiang, Dalin Township, Chiayi County (TW)

(73) Assignee: System General Corporation, New Taipei (TW)

( * ) Notice: Subject to any disclaimer, the term of this patent is extended or adjusted under 35 U.S.C. 154(b) by 155 days.

(21) Appl. No.: 13/466,942

(22) Filed: May 8, 2012

(65) Prior Publication Data

US 2013/0301324 A1 Nov. 14, 2013

(51) Int. Cl.
*H02M 1/12* (2006.01)
*G05F 1/44* (2006.01)

(52) U.S. Cl.
USPC ............. 363/44; 363/45; 363/46; 323/222; 323/223; 323/224; 323/282; 323/284; 323/285; 323/286

(58) Field of Classification Search
USPC ........ 363/44, 45, 46; 323/222, 223, 224, 282, 323/284, 285, 286
See application file for complete search history.

(56) References Cited

U.S. PATENT DOCUMENTS

| 7,203,079 | B2 | 4/2007 | Yang et al. | |
|---|---|---|---|---|
| 7,391,628 | B2 | 6/2008 | Yang et al. | |
| 8,040,122 | B2* | 10/2011 | Chang et al. | 323/288 |
| 8,169,206 | B2* | 5/2012 | Chang et al. | 323/284 |
| 2007/0159143 | A1* | 7/2007 | Yang | 323/247 |
| 2007/0159856 | A1* | 7/2007 | Yang | 363/21.12 |
| 2007/0171682 | A1* | 7/2007 | Yang et al. | 363/20 |
| 2011/0068763 | A1* | 3/2011 | Chang et al. | 323/288 |

* cited by examiner

*Primary Examiner* — Bao Q Vu
(74) *Attorney, Agent, or Firm* — McClure, Qualey & Rodack, LLP

(57) ABSTRACT

The present invention provides a circuit of reducing electro-magnetic interference for a power converter. The circuit includes an oscillator, a switching voltage divider, and a sample-and-hold circuit. The oscillator has a terminal for receiving a modulation voltage. The modulation voltage is correlated with an input voltage obtained from an input of the power converter. The switching voltage divider is enabled and disabled by a switch to attenuate the input voltage into a sampled voltage in response to a sampling signal. The sample-and-hold circuit receives the sampled voltage to generate the modulation voltage. A switch of the sample-and-hold circuit controlled by a holding signal conducts the sampled voltage to a capacitor of the sample-and-hold circuit to generate the modulation voltage across the capacitor.

14 Claims, 4 Drawing Sheets

US 8,649,194 B2

ELECTRO-MAGNETIC INTERFERENCE REDUCTION CIRCUIT FOR POWER CONVERTERS AND METHOD THEREOF

BACKGROUND OF THE INVENTION

1. Field of the Invention

The present invention relates to switching power supplies, and more specifically to an Electro-Magnetic Interference (EMI) reduction circuit for power converters.

2. Description of the Related Art

FIG. 1A shows a schematic of a power converter, which is a PFC (power factor correction) power converter. The power converter as shown in FIG. 1A comprises an EMI filter 5, a bridge rectifier 10, an inductor 11, a rectifier 12, a power switch 13, a bulk capacitor 14, a voltage divider formed by resistors 16 and 17, and a controller 90. The operation of the PFC power converter shown in FIG. 1A is well known to those skilled in the art and will be omitted herein.

In order to meet regulations, such as FCC emission standards for electro-magnetic interference (EMI), the EMI filter 5 is equipped between an alternating current (AC) mains $V_{AC}$ and the bridge rectifier 10. However, the EMI filter 5 occupies significant layout space and increases component costs to power converters. Some prior arts had proposed solutions to eliminate the need of the EMI filter 5, such as U.S. Pat. No. 7,203,079 titled "Switching Controller Having Frequency Hopping for Power Supplies" and U.S. Pat. No. 7,391,628 titled "Switching Controller Having Frequency Hopping for Power Supplies and Method Therefore". The aforementioned prior arts need a jittering signal generation circuit (pattern generator) which occupies significant space on the controller chip and increases the manufacturing cost. Therefore, a cost-effective frequency jittering circuit is desired by the industry.

BRIEF SUMMARY OF THE INVENTION

The present invention provides a circuit of reducing electro-magnetic interference for a power converter. The circuit comprises an oscillator, a switching voltage divider, a sample-and-hold circuit, a feedback circuit, and a ramping generator. The oscillator has a terminal for receiving a modulation voltage. The modulation voltage is correlated with an input voltage obtained from an input of the power converter. The switching voltage divider is enabled and disabled by a switch to attenuate the input voltage into a sampled voltage in response to a sampling signal. The sample-and-hold circuit receives the sampled voltage to generate the modulation voltage. A switch of the sample-and-hold circuit controlled by a holding signal conducts the sampled voltage to a capacitor of the sample-and-hold circuit to generate the modulation voltage across the capacitor of the sample-and-hold circuit.

The feedback circuit receives a feedback signal from an output of the power converter. The feedback circuit generates an error signal. The ramping generator generates a ramping signal to be compared with the error signal to disable a switching signal of the circuit. The ramping generator receives the switching signal to generate the ramping signal. A magnitude of the modulation voltage is varied in proportion to that of the input voltage. The modulation voltage is converted into at least one digital output bit to vary a frequency of the oscillator. The at least one digital output bit is capable of varying a capacitance of a capacitor of the oscillator. The at least one digital output bit is also capable of varying a charging current to a capacitor of the oscillator. The at least one digital output bit is also capable of varying a trip-point threshold of a voltage across a capacitor of the oscillator.

The present invention also provides a method of reducing electro-magnetic interference for a power converter. The method comprises the steps of: generating a sampled voltage by attenuating an input voltage obtained from an input of the power converter in response to a sampling signal; generating a modulation voltage in response to the sampled voltage; and generating at least one digital output bit to vary a frequency of an oscillator in response to the modulation voltage. The frequency of the oscillator determines a frequency of a switching signal. The modulation voltage is used for spreading a frequency spectrum of the frequency of the switching signal. The method further comprises receiving a feedback signal from an output of the power converter to generate an error signal; comparing a ramping signal from a ramping generator with the error signal to disable the switching signal; and receiving a pulse signal to enable the switching signal. The pulse signal is generated from the oscillator. The ramping signal is generated in response to the switching signal.

It is an objective of the present invention to provide a circuit and a method for reducing electro-magnetic interference for a power converter by spreading a spectrum of a switching signal.

It is another objective of the present invention to provide a circuit spreading a frequency spectrum of a switching signal using a waveform of a line signal obtained from an input of the power converter, which eliminates the need of an additional jittering signal generator.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
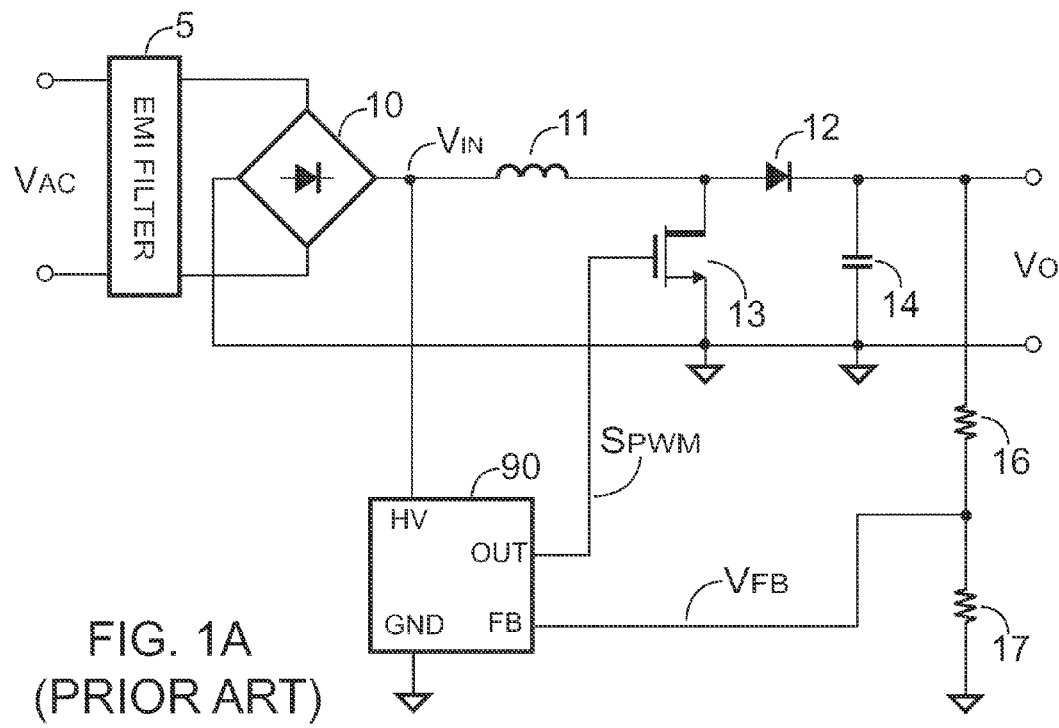
FIG. 1A shows a traditional PFC power converter.
Figure 1B:
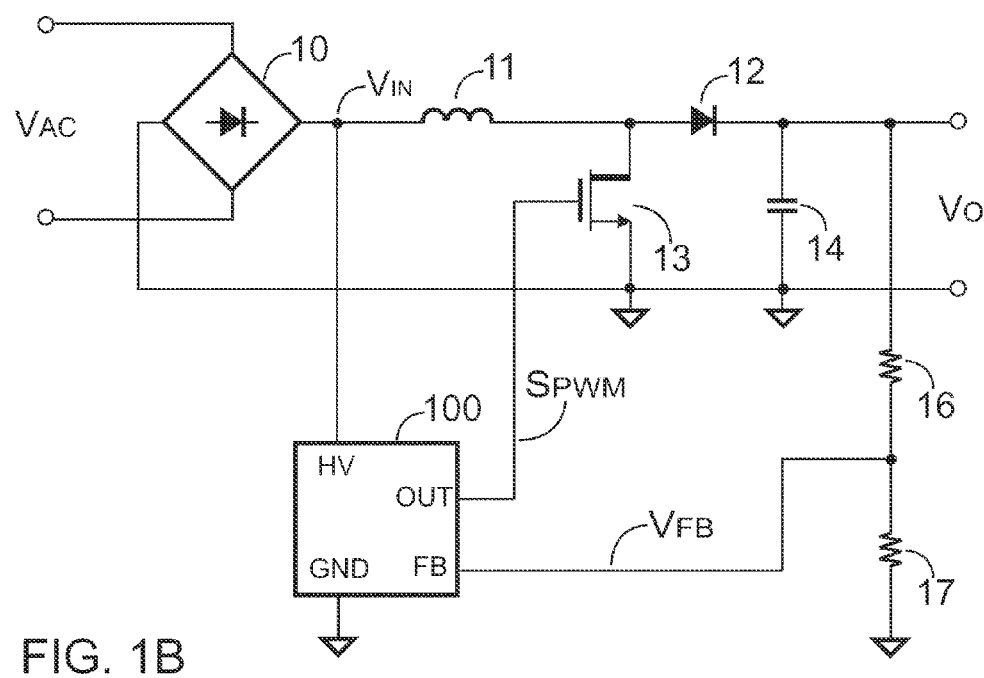
FIG. 1B shows a PFC power converter according to the present invention.

FIG. 1B shows a PFC (power factor correction) power converter according to the present invention. Some other power factor correction operating descriptions of the PFC power converter are omitted hereinafter since they are well known to those skilled in the art and are out of the scope of the present invention. The PFC power converter as shown in FIG. 1B comprises a bridge rectifier 10, an inductor 11, a rectifier 12, a power switch 13, a bulk capacitor 14, a voltage divider formed by resistors 16 and 17, and a controller 100. Compared to the embodiment shown in FIG. 1A, the EMI filter 5 shown in FIG. 1A is not included in this embodiment. The EMI is now reduced by the frequency jittering operation provided by the controller 100. Following descriptions will introduce a simple design for frequency jittering operation without the jittering signal generator to save the manufacturing cost according to the present invention.

Figure 2:
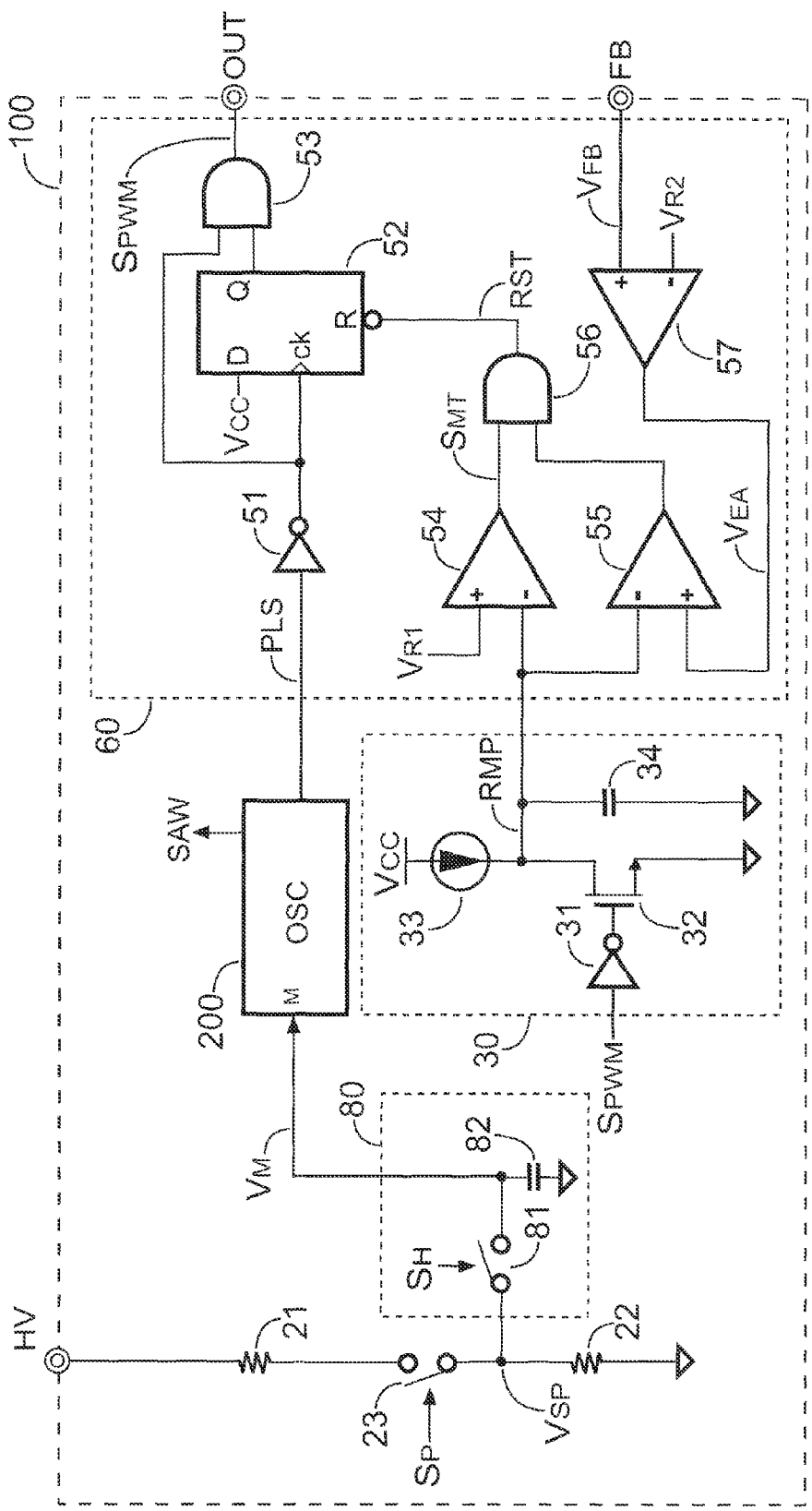
FIG. 2 shows an embodiment of a controller of the PFC power converter according to the present invention.
Figure 4:
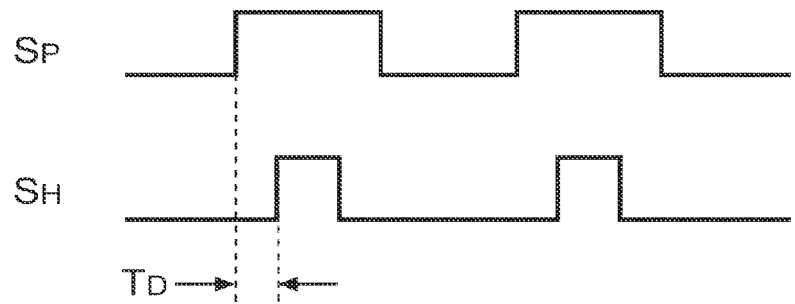
FIG. 4 shows waveforms of a sampling signal and a holding signal according to the present invention.

FIG. 2 shows an embodiment of the controller 100 according to the present invention. The controller 100 comprises a switching voltage divider, a ramping generator 30, a switching circuit 60, a sample-and-hold circuit 80, and an oscillator (OSC) 200. The sample-and-hold circuit 80 comprises a switch 81 and a capacitor 82. The switching voltage divider comprises a resistor 21, a resistor 22, and a switch 23. The switch 23 can be embodied with any component which conducts on/off control, such as MOSFET, JFET, etc. The resistor 21 is electrically connected between a high-voltage terminal HV and a first terminal of the switch 23. The resistor 22 is electrically connected between a second terminal of the switch 23 and a ground reference. The high-voltage terminal HV receives a pulsating input voltage $V_{IN}$ from an output of the bridge rectifier 10. The switch 23 is controlled by a sampling signal Sp whose frequency is higher than that of the pulsating input voltage $V_{IN}$. In one embodiment of the present invention, the frequency of the sampling signal $S_P$ is twenty times of that of the pulsating input voltage $V_{IN}$. Once the switch 23 is turned on by the sampling signal $S_P$, the input voltage $V_{IN}$ will be attenuated by the switching voltage divider into a sampled voltage $V_{SP}$. Referring to FIG. 4, a holding signal $S_H$ is enabled after a delay time $T_D$ from a time point when the sampling signal Sp begins to be enabled. As the holding signal $S_H$ is enabled, the sampled voltage $V_{SP}$ is conducted to the capacitor 82 via the switch 81 for generating a modulation voltage $V_M$. The oscillator 200 receives the modulation voltage $V_M$ at a terminal M to generate a saw-tooth signal SAW and a pulse signal PLS.

The ramping generator 30 comprises an inverter 31, a transistor 32, a current source 33, and a capacitor 34. The transistor 32 is controlled by a switching signal $S_{PWM}$ via the inverter 31. As the switching signal $S_{PWM}$ is enabled, the current source 33 will start to charge the capacitor 34. As the switching signal $S_{PWM}$ is disabled, the capacitor 34 will be discharged. A ramping signal RMP across the capacitor 34 is therefore generated in response to the switching signal $S_{PWM}$.

The switching circuit 60 comprises an inverter 51, a flip-flop 52, an AND gate 53, a comparator 54, and a feedback circuit. The feedback circuit comprises a comparator 55, an AND gate 56 and an error amplifier 57. The pulse signal PLS is supplied to a clock-input ck of the flip-flop 52 via the inverter 51. A D-input of the flip-flop 52 is supplied with a supply voltage $V_{CC}$. An input of the AND gate 53 is electrically connected to an output of the inverter 51. The other input of the AND gate 53 is electrically connected to an output Q of the flip-flop 52. An output of the AND gate 53 generates the switching signal $S_{PWM}$ at an output terminal OUT of the controller 100. The ramping signal RMP is supplied to negative terminals of the comparators 54 and 55. A positive terminal of the comparator 54 is supplied with a first reference voltage $V_{R1}$. The comparator 54 compares the ramping signal RMP with the first reference voltage $V_{R1}$ to generate a maximum-duty signal $S_{MT}$. The maximum-duty signal $S_{MT}$ is supplied to an input of the AND gate 56. A feedback signal $V_{FB}$ and a second reference voltage $V_{R2}$ are respectively supplied to a positive terminal and a negative terminal of the error amplifier 57. The feedback signal $V_{FB}$ is obtained at the joint of resistors 16 and 17 shown in FIG. 1B and received by the controller 100 via a feedback terminal FB, which is correlated with an output voltage $V_O$ of the PFC power converter. The error amplifier 57 amplifies the difference of the feedback signal $V_{FB}$ and the second reference voltage $V_{R2}$ to generate an error signal $V_{EA}$. The error signal $V_{EA}$ is supplied to a positive terminal of the comparator 55. The comparator 55 provide an output signal to the other input of the AND gate 56 by comparing the ramping signal RMP and the error signal $V_{EA}$. An output of the AND gate 56 generates a reset signal RST to disable the switching signal $S_{PWM}$ via the flip-flop 52 whenever the level of the maximum-duty signal $S_{MT}$ or the output signal of the comparator 55 becomes logic-low.

Figure 3:
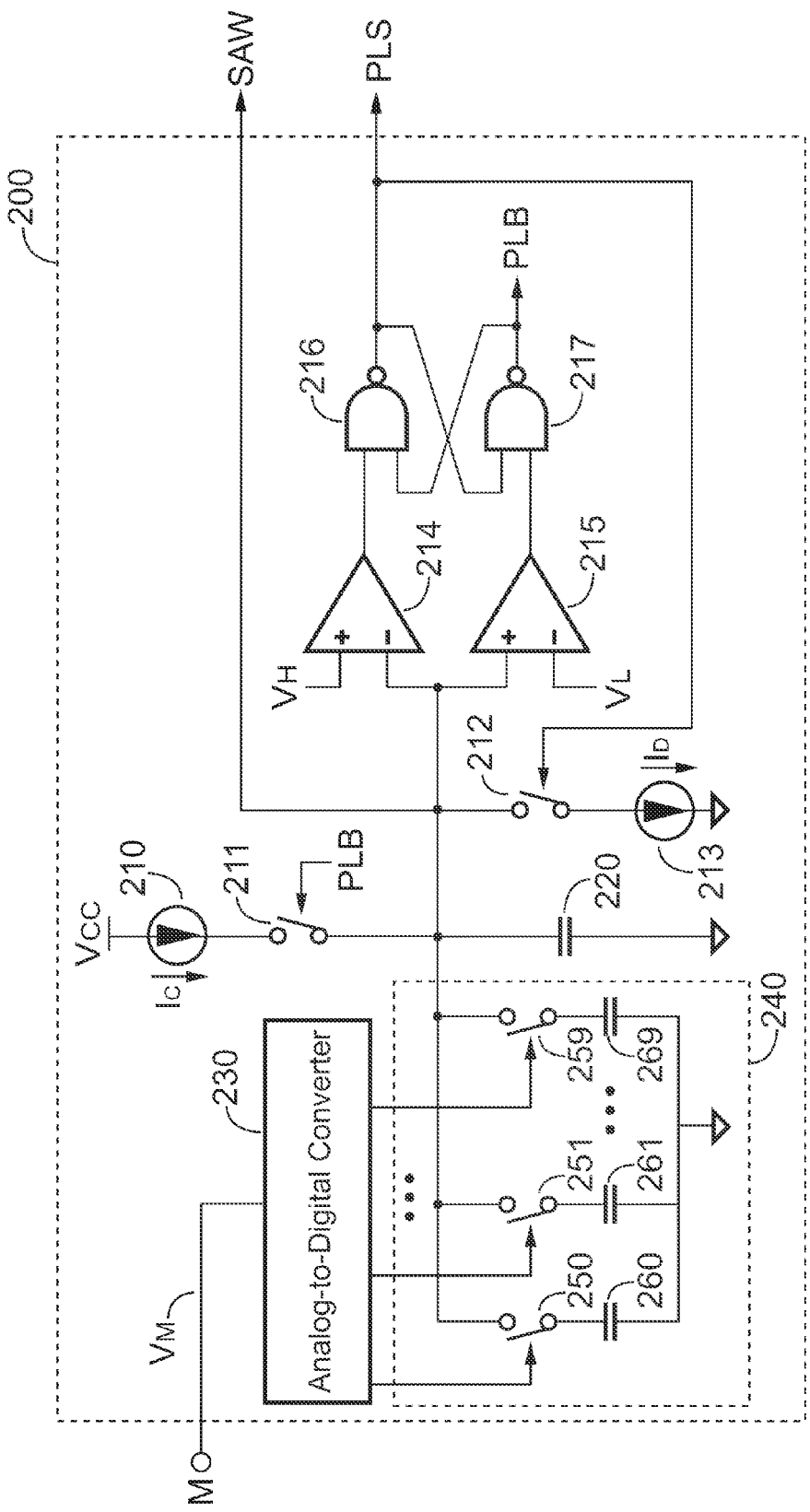
FIG. 3 shows an embodiment of an oscillator of the controller according to the present invention.

FIG. 3 shows an embodiment of the oscillator 200 of the controller 100 according to the present invention. The oscillator 200 comprises current sources 210 and 213, switches 211 and 212, a capacitor 220, comparators 214 and 215, NAND gates 216 and 217, an analog-to-digital converter 230 and an adaptive capacitor 240. The current source 210 generating a charging current $I_C$ is electrically connected between the supply voltage $V_{CC}$ and a first terminal of the switch 211. A second terminal of the switch 211 is electrically connected to a first terminal of the switch 212. The current source 213 generating a discharging current $I_D$ is electrically connected between a second terminal of the switch 212 and a ground reference. A first terminal of the capacitor 220 is electrically connected to the second terminal of the switch 211. A second terminal of the capacitor 220 is electrically connected to the ground reference. The second terminal of the switch 211 is further electrically connected to a negative terminal of the comparator 214 and a positive terminal of the comparator 215. A positive terminal of the comparator 214 receives an upper-threshold (trip-point threshold) $V_H$. A negative terminal of the comparator 215 receives a lower-threshold $V_L$. The NAND gates 216 and 217 form a latch circuit which receives the outputs of the comparators 214 and 215. The NAND gate 216 generates the pulse signal PLS, and the NAND gate 217 generates an inverse pulse signal PLB. The switch 211 is controlled by the inverse pulse signal PLB. The switch 212 is controlled by the pulse signal PLS. The charging current $I_C$ and the discharging current $I_D$ are applied to the capacitor 220 to generate the saw-tooth signal SAW across the capacitor 220. The analog-to-digital converter 230 receives the modulation voltage $V_M$ to generate at least one digital output bit. The adaptive capacitor 240 at least comprises at least a switch 250 and a capacitor 260 electrically connected in series between the first terminal of the capacitor 220 and the ground reference. The digital output bit controls the switch 250 to connect the capacitor 260 to the capacitor 220 in parallel or disconnect from the capacitor 220. The adaptive capacitor 240 can also includes additional switches 251~259 and capacitors 261~269. The switches 251~259 can be further controlled by other digital output bits of the analog-to-digital converter 230 to vary the capacitance of the adaptive capacitor 240. The digital output bits are varied in response to the modulation voltage $V_M$ to vary the capacitance of the adaptive capacitor 240. Since the capacitor 220 is electrically connected with the adaptive capacitor 240 in parallel, the charging current $I_C$ will charge the capacitor 220 and the adaptive capacitor 240 at the same time, which varies a charging slope of the saw-tooth signal SAW in response to the modulation voltage $V_M$. The frequency of the pulse signal PLS (that is the frequency of the oscillator 200) is therefore varied in response to the modulation voltage $V_M$, which varies the frequency of the switching signal $S_{PWM}$.

In this embodiment of the present invention, the digital output bits generated in response to the modulation voltage $V_M$ are used to selectively control the switches 250~259 to respectively electrically connect capacitors 260~269 to the capacitor 220 in parallel. In another embodiment of the present invention, the digital output bits are in similar manner to vary the amplitude of the charging current $I_C$, which is also capable of varying the frequency of the pulse signal PLS. In further another embodiment of the present invention, the digital output bits are in similar manner to vary the difference between the upper-threshold $V_H$ and the lower-threshold $V_L$, for example by vary the upper-threshold, which is also capable of varying the frequency of the pulse signal PLS.

FIG. 4 shows the waveforms of the sampling signal $S_P$ and the holding signal $S_H$. The holding signal $S_H$ is generated in response to the sampling signal $S_P$ with the delay time $T_D$.

Figure 5:
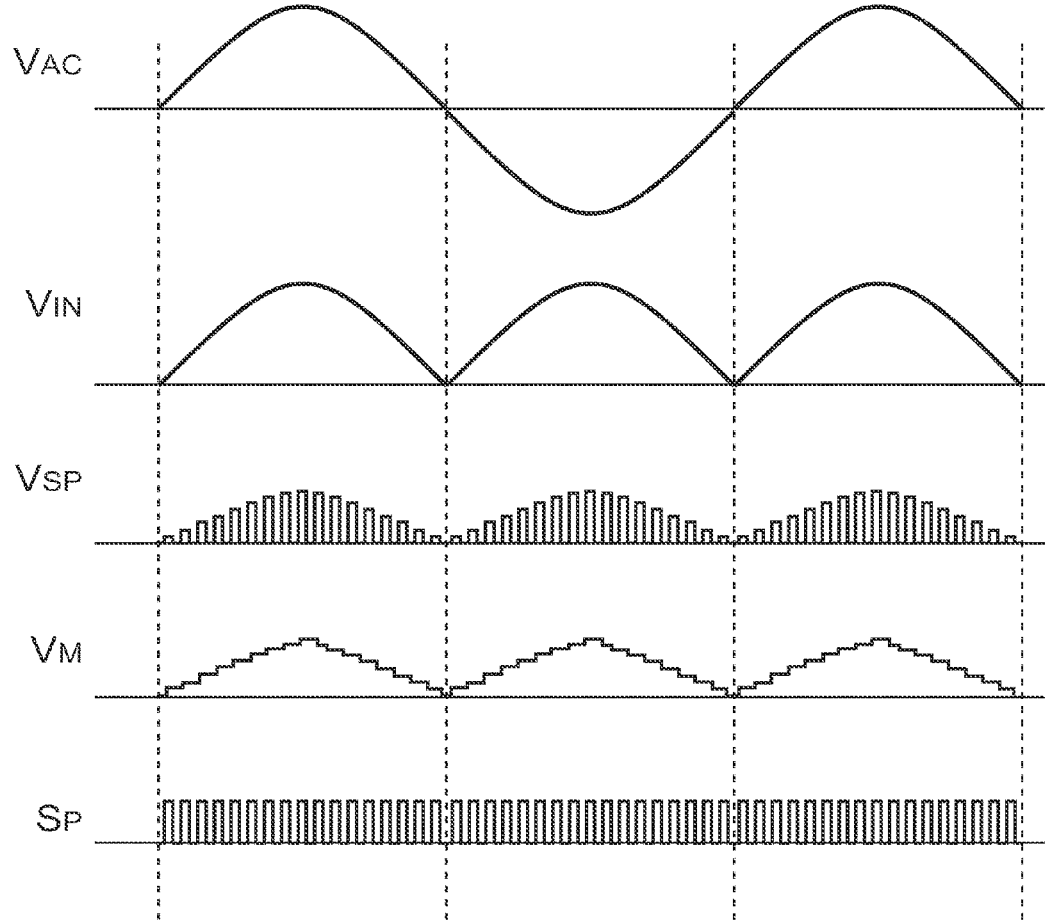
FIG. 5 shows waveforms of an alternating voltage, a pulsating input signal, a sampled voltage, a modulation voltage and the sampling signal according to the present invention.

FIG. 5 shows the waveforms of the alternating current mains $V_{AC}$, the pulsating input voltage $V_{IN}$, the sampled voltage $V_{SP}$, the modulation voltage $V_M$, and the sampling signal $S_P$. Referring to FIG. 2 and FIG. 5, as the sampling signal Sp is enabled, the pulsating input voltage $V_{IN}$ is attenuated into a sampled voltage $V_{SP}$. The amplitude of the sampled voltage $V_{SP}$ is therefore in proportion to the pulsating input voltage $V_{IN}$. Via the switch 81 controlled by the holding signal $S_H$, the sampled voltage $V_{SP}$ is held across the capacitor 82 to generate the modulation voltage $V_M$. The present invention spreads the spectrum of the frequency of the switching signal $S_{PWM}$ by varying the pulse signal PLS in response to the modulation voltage $V_M$ which is in proportion to the pulsating input voltage $V_{IN}$ obtained from an input of the power converter. Therefore, the circuit design is simplified and the manufacturing cost is saved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A circuit of reducing electro-magnetic interference for a power converter, comprising:
    an oscillator having a terminal for receiving a modulation voltage, wherein said modulation voltage is correlated with an input voltage obtained from an input of said power converter;
    a switching voltage divider enabled and disabled by a switch to attenuate said input voltage into a sampled voltage in response to a sampling signal; and
    a sample-and-hold circuit receiving said sampled voltage to generate said modulation voltage, wherein a switch of said sample-and-hold circuit controlled by a holding signal conducts said sampled voltage to a capacitor of said sample-and-hold circuit to generate said modulation voltage across said capacitor of said sample-and-hold circuit.

2. The circuit as claimed in claim 1 further comprising a feedback circuit, wherein said feedback circuit receives a feedback signal from an output of said power converter, wherein said feedback circuit generates an error signal.

3. The circuit as claimed in claim 2 further comprising a ramping generator, wherein said ramping generator generates a ramping signal to be compared with said error signal to disable a switching signal of said circuit.

4. The circuit as claimed in claim 3, wherein said ramping generator receives said switching signal to generate said ramping signal.

5. The circuit as claimed in claim 1, wherein a magnitude of said modulation voltage is varied in proportion to that of said input voltage.

6. The circuit as claimed in claim 1, wherein said modulation voltage is converted into at least one digital output bit to vary a frequency of said oscillator.

7. The circuit as claimed in claim 6, wherein said at least one digital output bit varies a capacitance of a capacitor of said oscillator.

8. The circuit as claimed in claim 6, wherein said at least one digital output bit varies a charging current to a capacitor of said oscillator.

9. The circuit as claimed in claim 6, wherein said at least one digital output bit varies a trip-point threshold of a voltage across a capacitor of said oscillator.

10. A method of reducing electro-magnetic interference for a power converter comprising:
    generating a sampled voltage by attenuating an input voltage obtained from an input of said power converter in response to a sampling signal;
    generating a modulation voltage in response to said sampled voltage; and
    generating at least one digital output bit to vary a frequency of an oscillator in response to said modulation voltage, wherein said frequency of said oscillator determines a frequency of a switching signal.

11. The method as claimed in claim 10, wherein said modulation voltage is used for spreading a frequency spectrum of said frequency of said switching signal.

12. The method as claimed in claim 10 further comprising:
    receiving a feedback signal from an output of said power converter to generate an error signal; and
    comparing a ramping signal from a ramping generator with said error signal to disable said switching signal.

13. The method as claimed in claim 12 further comprising:
    receiving a pulse signal to enable said switching signal, wherein said pulse signal is generated from said oscillator.

14. The method as claimed in claim 13, wherein said ramping signal is generated in response to said switching signal.

* * * * *